(12) United States Patent
Heyring et al.

(10) Patent No.: US 6,519,517 B1
(45) Date of Patent: Feb. 11, 2003

(54) ACTIVE RIDE CONTROL FOR A VEHICLE SUSPENSION SYSTEM

(75) Inventors: Christopher B Heyring, Eagle Bay (AU); Michael J. Longman, Dunsborough (AU)

(73) Assignee: Kinetic Pty. Ltd., Dunsborough (AU)

( * ) Notice: Subject to any disclaimer, the term of this patent is extended or adjusted under 35 U.S.C. 154(b) by 0 days.

(21) Appl. No.: 09/958,749

(22) PCT Filed: Apr. 12, 2000

(86) PCT No.: PCT/AU00/00311

§ 371 (c)(1),
(2), (4) Date: Dec. 12, 2001

(87) PCT Pub. No.: WO00/61393

PCT Pub. Date: Oct. 19, 2000

(30) Foreign Application Priority Data

Apr. 12, 1999 (AU) .............................................. PP 9709
Apr. 23, 1999 (AU) .............................................. PP 9983
Feb. 11, 2000 (AU) .............................................. PQ 5570

(51) Int. Cl.[7] ................................................. G06F 7/00
(52) U.S. Cl. ............... 701/37; 280/124.159; 280/5.502; 280/5.507; 280/5.508
(58) Field of Search ..................... 701/37; 280/124.106, 280/124.159, 5.503, 5.507, 5.502, 5.508

(56) References Cited

U.S. PATENT DOCUMENTS

| | | | |
|---|---|---|---|
| 5,193,845 A | * 3/1993 | Yokote et al. | ........... 280/5.503 |
| 5,480,188 A | 1/1996 | Heyring | |
| 5,794,966 A | 8/1998 | Macleod | |
| 6,010,139 A | * 1/2000 | Heyring et al. | ....... 280/124.104 |

FOREIGN PATENT DOCUMENTS

| | | |
|---|---|---|
| EP | A 0 858 918 | 8/1998 |
| WO | A 95/23076 | 8/1995 |
| WO | A 98/18641 | 5/1998 |

* cited by examiner

*Primary Examiner*—Gertrude Arthur
(74) *Attorney, Agent, or Firm*—Harness, Dickey & Pierce, PLC

(57) ABSTRACT

A roll control system (1) for a vehicle suspension system, the vehicle having at least one pair of lately spaced front wheel assemblies (2) and at least one pair of laterally spaced rear wheel assemblies (3), each wheel assembly (2, 3) including a wheel (4) and a wheel mounting (5) permitting wheel movement in a generally vertical direction relative to vehicle body, and vehicle support means (17a, 17b) for providing at least substantially a major portion of the support for the vehicle; the roll control system (1) including: wheel cylinders (8) respectively locatable between each wheel mounting (5) and the vehicle body, each wheel cylinder (8) including an inner volume separated into first (51) and second (52) chambers by a piston (53) supported within; first and second fluid circuits (7) respectively providing fluid connection between the wheel cylinders (8) by fluid conduits (9, 10, 11), each said fluid circuit providing fluid communication between the said first chambers (51) on one side of the vehicle and the said second chambers (52) on the opposite side of the vehicle to thereby provide roll support decoupled from a warp mode of the vehicle suspension system by providing a roll stiffness about a level roll attitude while simultaneously providing substantially zero warp stiffness; and a fluid control means (26) connected to said first and second fluid circuits (7) for supplying or drawing fluid from each said fluid circuit (7) as a function of the ride characteristics of the vehicle.

30 Claims, 10 Drawing Sheets

ACTIVE RIDE CONTROL FOR A VEHICLE SUSPENSION SYSTEM

CROSS-REFERENCE TO RELATED APPLICATIONS

This application is the national phase under 35 U.S.C. § 371 of PCT International Application No. PCT/AU00/00311 which has an International filing date of Apr. 12, 2000, which designated the United States of America.

FIELD OF THE INVENTION

The present invention is directed to vehicle suspension systems, and in particular to suspension systems incorporating interconnected dampers and active roll control.

STATEMENT REGARDING FEDERALLY SPONSORED RESEARCH OR DEVELOPMENT not applicable

INCORPORATION-BY-REFERENCE OF MATERIAL SUBMITTED ON A COMPACT DISC not applicable

REFERENCE TO "MICROFICHE APPENDIX"

not applicable

BACKGROUND OF THE INVENTION

In order to provide increased ride comfort and vehicle stability, a wide variety of solutions have been proposed. These can be categorised into several groups; damping systems; passive roll control and vehicle support; active roll control systems; active body control systems (also known as low-bandwidth active systems); and fully active (high bandwidth) suspension systems.

Damping systems proposed cover a wide range of concepts from passive, single wheel dampers (which provide damping forces determined in part by: position in the stroke, acceleration of the damper piston; load on the wheel) through passive interconnected dampers (which can provide different damping forces for the different suspension modes of roll, pitch and heave) up to electronically controlled "semi-active" dampers which modulate the damping force in dependence on sensed vehicle operating conditions (such as roll, yaw, etc.) to enable optimal damping to be provided at all times, giving increased comfort and stability. Without providing heave or roll stiffness, there is a limit to how effective these type of systems can be.

Passive roll control and vehicle support systems which decouple different suspension modes can vary from completely mechanical systems through to completely hydraulic systems. The ability to decouple the roll, warp and heave stiffness modes of a suspension allows more optimal tuning of each stiffness, allowing increased roll stiffness and stability and increased comfort. However, there is a limit to the amount of roll stiffness which can be provided before the ride comfort deteriorates. There is a trend towards suspension systems with very low roll angles, even at large lateral g, which to achieve passively can require excessive roll stiffness, thereby limiting ride comfort.

Active roll control systems usually rely on lateral stabiliser bars with hydraulic actuation to enable control of body roll angle through controlling the torsional force in the stabiliser bar. Packaging of the stabiliser bar including the hydraulic actuator can be difficult, especially at the front of a vehicle around the front subframe, suspension geometry and engine.

Active body control systems generally use conventional, soft springs for each wheel to improve comfort in conjunction with hydraulic actuators to control and limit body motion in roll and pitch. As these systems are controlling only body position, they do not need to respond to high frequency, small magnitude individual wheel inputs, which are generally absorbed by the low spring rate. The controllers can therefore be relatively low speed or "low bandwidth". These types of systems do not generally provide vehicle damping.

Fully active suspension systems support the vehicle on hydraulic struts which are all controlled by a central computer. In order to react fast enough each wheel may have a local fluid source and a local computer to control small high frequency (high bandwidth) wheel inputs. The local computer usually senses actuator load and position, wheel and body acceleration, etc. This must communicate with the central computer which controls overall body position by communicating with the computers for each wheel and using additional inputs such as throttle, brake and steering positions, body accelerations, actuator positions. These systems are highly complex and expensive.

Most of the above types of suspension system have reached only limited production, due to varying reasons such as conflicts between cost, packagability, complexity, efficiency, weight and refinement It is therefore preferable to provide a suspension system incorporating an interconnected damper arrangement providing damping and roll stiffness and further incorporating a low bandwidth active control of the vehicle roll angle.

BRIEF SUMMARY OF THE INVENTION

It is therefore an object of the present invention to provide a vehicle suspension system incorporating an active roll control system including at least four wheel cylinders.

It is another object of the present invention to provide a combined damping and active roll control system.

With this in mind, the present invention provides a damping and roll control system for a vehicle suspension system, the vehicle having at least one pair of laterally spaced front wheel assemblies and at least one pair of laterally spaced rear wheel assemblies, each wheel assembly including a wheel and a wheel mounting locating the wheel to permit movement of the wheel in a generally vertical direction relative to a body of the vehicle, and vehicle support means for providing at least substantially all of the support for the vehicle; the damping and roll control system including;

wheel cylinders respectively locatable between each wheel mounting and the body of the vehicle, each wheel cylinder including an inner volume separated into first and second chambers by a piston supported within the wheel cylinder;

first and second fluid circuits respectively providing fluid communication between the wheel cylinders by fluid conduits, each said fluid circuit providing fluid communication between the first chambers of the wheel cylinders on one side of the vehicle and the second chambers of the wheel cylinders on the opposite side of the vehicle to thereby provide roll support decoupled from the warp mode of the vehicle suspension system by providing a roll stiffness about a level roll attitude whilst simultaneously providing substantially zero warp stiffness;

each fluid circuit including one or more fluid accumulators for providing roll resilience;

the or at least one of the accumulators on each fluid circuit including an accumulator damper means for controlling the rate of fluid flow into and out of the accumulator;

damper means for controlling the rate of fluid flow into and out of at least one chamber of each wheel cylinder; and a fluid control means connected to said first and second fluid circuits for supplying or drawing fluid from each said fluid circuit as a function of the ride characteristics of the vehicle;

the damping and roll control system thereby providing substantially all of the damping of the vehicle suspension system.

The damper means of the damping and roll control system are being provided to control the rate of fluid flow into and out of at least one chamber of each wheel cylinder to thereby provide substantially all of the damping of the vehicle suspension system. The conduits may be sized to provide at least a portion of the high speed damping of the vehicle suspension system, but as they give a fixed, non-linear effects normally damper means are also necessary, The vehicle support means may in certain embodiments of the present invention provide at least substantially all of the support for the vehicle.

The damping and roll control system therefore provides damping for the vehicle suspension and provides a roll stiffness without introducing a corresponding warp stiffness.

Each fluid circuit may in one preferred embodiment according to the present invention include a first fluid conduit providing fluid communication between the first chambers of the wheel cylinders on one side of the vehicle; and a second fluid conduit providing fluid communication between the second chambers of the wheel cylinders on the opposite side of the vehicle; the first and second fluid conduits being in fluid communication.

According to another preferred embodiment according to the present invention, each fluid circuit may include first and second diagonal fluid conduits, each respectively providing fluid communication between the first chamber of one wheel cylinder on one side of the vehicle and the second chamber of the diagonally opposite wheel cylinder on the other side of the vehicle; the first diagonal fluid conduit between one pair of diagonally opposite wheel cylinders being in fluid communication with the second diagonal fluid conduit between the other pair of diagonally opposite wheel cylinders.

According to yet another preferred embodiment according to the present invention, each fluid circuit may include a front fluid conduit providing fluid communication between the wheel cylinders of the front wheel assemblies, and a rear fluid conduit providing fluid communication between the wheel cylinders of the rear wheel assemblies, with the front and rear conduits respectively providing fluid communication between the first chamber of the wheel cylinder at one side of the vehicle with the second chamber of the wheel cylinder at the opposite side of the vehicle, the front and rear conduits being in fluid communication.

It is to be appreciated that other connection arrangements are also envisaged. It is also to be appreciated that the same principles may be applied to vehicles with more than four wheels. For example, to apply the system to a six wheeled vehicle, the additional left hand wheel cylinder will have its first chamber connected to the conduit connecting the first chambers of the other two left hand wheel cylinders, and its second chamber connected to the conduit connecting the second chambers of the other two left hand wheel cylinders. The connection of the other cylinder to the right hand side of the vehicle similarly communicates first chambers together and second chambers together.

The damper means may be located at or in the wheel cylinders, in the conduits, and/or in a manifold block. The manifold block may be centrally located in the vehicle and may provide the required fluid communication between the first and second conduits to form the first and second fluid circuits. The damper means may be bi-directional (ie. provide controlled flow restriction in both directions), in which case each wheel cylinder may require only one damper means for one of the first or second chambers. In this case, the associated chamber may try to suck a vacuum it the damper valve is not supplying fluid at the same rate at it is being demanded. This can lead to aeration of the fluid and potential loss of ride control by the system. To avoid this effect, a single direction damper valve may be used to ensure that the wheel cylinder chambers only act through a damper valve when expelling fluid, thereby substantially preventing fluid aeration in the cylinder chambers. Alternatively, the single direction damper valve may be used in parallel with a non-return valve. Alternatively, to provide large damping forces with reliable, compact damper valve means, a bi-directional damper means may be provided for each of the first and second chambers of at least one pair of laterally spaced wheel cylinders.

Each said fluid circuit, includes a primary fluid accumulator to allow for changes in the fluid volume of each circuit to thereby provide roll resilience. Also, if a wheel cylinder with differing effective piston areas between the first and second chambers is used (for example a piston having a rod extending from one side only, as in a conventional damper cylinder assembly), the accumulator needs to be able to accommodate the rod volume changes within the system during bounce motions of the suspension. In this case, in roll, the accumulator absorbs a much greater change of fluid volume per unit displacement of the wheel cylinders than it absorbs in bounce as both the effective areas of a first chamber side and a second chamber side are working to displace fluid into the accumulator giving a correspondingly higher stiffness for roll motions of the roll Control system than for bounce motions.

Each fluid circuit may include at least one secondary fluid accumulator to provide increased roll resilience. Between each second accumulator and the respective fluid circuit there may be a roll resilience switching valve. When the vehicle is travelling in a straight line, the valve may be held open to allow the second accumulators to communicate with the associated fluid circuits to provide additional roll resilience, thereby further improving ride comfort. When turning of the vehicle is detected, the roll resilience switching valve is closed to provide a desirable increase in roll stiffness during cornering. The detection of vehicle cornering may be performed in any known manner, using inputs for conditions such as steering rate of change, steering angle, lateral acceleration and vehicle speed. Any or all of these sensors and/or others not cited may be used, The accumulators may be of the gas or mechanically sprung piston type or the diaphragm type and either or both can be beneficial in limiting pressure change within the system due to fluid expansion and contraction with temperature changes, and in increasing the time to maintenance of the system by replenishing fluid lost from the system through leaks past rod seats and out of fittings. Any fluid loss should be minimal, therefore the effect on the operating pressure of the system over time may be negligible.

At least one of the accumulators in each fluid circuit has a damper means to control the rate of fluid flow into and/or out of the accumulator. Due to the higher rate of fluid flow into and out of the accumulators in roll when compared to bounce (as discussed earlier), the effect of the accumulator dampers is greater in roll than in bounce giving a desirable high roll damping to bounce damping ratio. It the accumulators are not damped, the roll damping is determined by the bounce damping, as is the case when using conventional dampers. Damping the accumulators (which provide roll resilience in the system) is also preferable when providing active control of the roll attitude of the vehicle, improving system response and reducing overshoot in the control system.

Damping the accumulators can also have a detrimental effect to single wheel input harshness as single wheel inputs are also heavily damped by accumulator dampers. To increase comfort in straight line running, it can therefore be advantageous to provide a bypass passage around the accumulator damper valve to permit fluid to bypass the damper for at least one accumulator. The bypass passage includes a valve to open or close the passage. During turning, the valve is in the closed position and the accumulator damper valves are providing high roll damping. In straight line running, the valve is open to reduce the roll and single wheel input damping forces in the system.

The roll control system may have a pressure precharge to allow the accumulators to function and supply fluid in rebound motions of the wheels (where they fall away from the vehicle body). This precharge is preferably about bar for the roll control system with the vehicle at standard unladen ride height It may be preferable to use a wheel cylinder design with a rod protruding from one side of the piston through only one chamber. This allows for a simple and cheap cylinder design, but any system precharge pressure acting over the unequal effective piston areas in the first and second chambers produces a net cylinder force. This force may provide some support of the vehicle body although the proportion of vehicle load supported by the roll control system is usually very small and is generally a similarly negligible percentage of (although it may be more than) the degree of support provided by a conventional precharged damper cylinder assembly. The exact amount is determined by the cylinder rod and bore dimensions, system precharge pressure and cylinder to wheel hub lever ratio.

For example, in the case where the first chamber of each wheel cylinder is in compression as the wheels move upwardly with respect to the vehicle body, and the effective area of the piston on the first chamber side is larger than the effective area of said piston on the second chamber side, thereby providing a degree of support of the vehicle body.

If accumulators with a non-linear spring function (ie a hydropneumatic accumulator which has an increasing stiffness in compression and a decreasing stiffness in rebound) are used and the roll control system provides a degree of vehicle support (as outlined above), then as the vehicle rolls due to lateral acceleration, the total volume of fluid in the accumulators can decrease overall, increasing the fluid volume in the roll control system and causing an overall increase in vehicle height (known as "roll jacking"). The degree of vehicle support provided by the roll control system influences the degree of roll jacking, with the effect being minimal when the roll system supports a low proportion of vehicle load.

It may be desirable to produce the inverse of the roll jacking effect such that the average height of the vehicle is lowered during cornering. This effect can be produced in the case where the first chamber of each wheel cylinder is in compression as the wheels move upwardly with respect to the vehicle body, and the effective area of the piston on the second chamber side is larger than the effective area of said piston on the first chamber side, thereby providing a degree of additional load on the vehicle support means, tending to push the vehicle down towards the ground.

Preferably, a simpler arrangement may be used with the cheaper cylinder design which provides vehicle support (discussed above). The resilient means in the first accumulator may include one or more mechanical springs such that the spring rate in the compression direction from the normal static position is lower than the spring rate in the rebound direction from the normal static position, to thereby give the reverse effect of a conventional hydropneumatic accumulator and lower the average height of the vehicle during cornering. Additionally or alternatively, the rebound damping rate of the accumulators may be higher than the compression damping rate to provide a similar vehicle lowering effect and better response to steering inputs during initial cornering (turn-in). Indeed, only rebound damping may be provided for the accumulators, with a non-return valve allowing virtually unrestricted flow in the compression direction (although this may not always be desirable as there can be side effects in the response of the active roll control).

Ideally, the roll control system should not provide any vertical support of the vehicle. Therefore, in another, preferred embodiment of the present invention, the effective piston areas in the first and second chambers of each cylinder may be similar, the roll control system thereby supporting substantially zero vehicle load. As the amount of vehicle load support provided by the roll control system is one of the main factors controlling the amount of roll jacking inherent in the system, using wheel cylinders with similar effective piston areas in the first and second chambers and which therefore do not provide any vehicle support provides the roll control system with zero roll jacking.

However, in some applications, the use of a cylinder having piston rods extending from both ends thereof can lead to packaging difficulties because of the need to provide clearance for the upwardly extending piston rod. Therefore, according to another preferred embodiment, a piston rod may extend from one side of the piston, the piston rod having as small a diameter as physically possible to minimize the vehicle support provided by the damping and roll control system. In another possible arrangement, a hollow piston rod may extend from one side of the piston, and an inner rod may be supported within the inner volume of the cylinder, the inner rod being at least partially accommodated within the hollow piston rod, the hollow piston rod moving together with the piston relative to the inner rod. This arrangement also acts to minimize the difference in area of the opposing piston faces to minimize the vehicle support provided by the damping and roll control system. This arrangement can also be designed to provide a smaller effective piston area on the compression chamber (of the roll control pair of chambers in the cylinder) than on the rebound side to give a lowering of the vehicle in roll, as described above.

According to an alternative preferred embodiment, the hollow piston rod arrangement of the wheel cylinder may be adapted to also provide a vertical support function for the vehicle. The piston supported in the wheel cylinder may provide an upper and lower chamber. The inner rod when supported within the hollow piston rod defines a rod chamber. This rod chamber may be used as part of a fluid circuit of the roll control system. To this end, the area of the peripheral end of the inner rod may be at least substantially identical to (or greater than) the area of the piston facing the lower chamber. The upper chamber may be sealed to provide a bounce chamber to provide resilient support for the vehicle. The rod chamber, together with the lower chamber, form a respective part of a fluid circuit of the roll control chamber.

It should be noted that the roll moment distribution for the roll control system is determined by the ratio between the effective piston areas of the front wheel cylinders compared to the effective piston areas of the rear wheel cylinders. Ideally, in most applications, each wheel cylinder should have a constant ratio between the effective piston area on the first chamber side compared to the second chamber side.

One advantage of using cylinders where the piston rod is only provided extending from the one piston face is that the degree of support provided by the cylinders can be varied by varying the support height of the vehicle. As the vehicle is lowered the support provided by the roll control system increases leading to higher roll stiffness. This is an affect of having an increased volume of piston rod introduced into the roll control system.

The support means for at least one pair of laterally spaced wheel assemblies may include first support means which are independent for each wheel assembly, thereby contributing an additional roll stiffness to the suspension system. Both the vehicle support means and the roll control system can together provide the roll stiffness for the vehicle in this arrangement Additionally or alternatively, the support means for at least one pair of laterally spaced wheels may include second support means which are interconnected between each wheel thereby contributing substantially zero roll stiffness to the suspension system. This and other vehicle support arrangements that provide little to no roll support and combinations of support arrangements are described in the Applicants' International Application No. PCT/AU97/00870 referred to previously. In such an arrangement, the damping and roll control system can provide substantially all of the roll control for the vehicle. Furthermore, if the support means have substantially zero roll stiffness, the damping and roll control system can provide substantially all of the roll control for the vehicle. In this case, neither the support means or roll control system provides significant warp stiffness. This allows for substantially free warp motion of the vehicle wheel assemblies, improving comfort, reactions to single wheel inputs and providing substantially constant wheel loads (and therefore improved traction) in low speed or non-dynamic warp motions when traversing uneven terrain such as in off-road situations.

In a second preferred embodiment of the present invention, the first and second fluid circuits may be in fluid communication such that fluid may be transferred therebetween. To this end, at least one bridge passage may interconnect the first and second fluid circuits to provide for said fluid communication. The bridge passage may be provided by a bridge conduit. Alternatively, the bridge passage may be provided within a connector body to which the conduits of the first and second circuits are connected. At least one flow control valve may be provided for controlling the flow through the bridge passage. However, the bridge passage may be inappropriate for use in the roll control system when the total volume of fluid in the system is fixed (there is no external reservoir). In many cases it may only be useful for system setup.

One or more accumulators may optionally also be provided for the bridge passage. The flow control valve and accumulator may be provided on a said bridge conduit. According to another preferred embodiment, the control valve and/or accumulator may be supported on the connector body. It is also possible for all the damper valves and accumulators previously referred to be located on a common said connector body to simplify the packaging of the system within a vehicle.

The flow control valve may be opened, for example when there is little demand on the roll control system when the vehicle is travelling on a straight road. When the flow control valve is opened, this leads to a "short-circuiting" of the system such that the first and second chambers of each cylinder are allowed to communicate directly.

The operation of the flow control valve may be controlled by an Electronic Control Unit on the basis of operational parameters such as the lateral acceleration, speed and steering rate of the vehicle.

It is also possible for a plurality of bridge passages to be provided interconnecting the first and second fluid circuits. Each bridge passage may be provided with a said flow control valve.

It is also possible that the wheel cylinder include an integral flow control valve and/or damper valve therein. The piston of the wheel cylinder may include a flow control valve and/or damper valve controlling the flow of fluid between the first and second chambers.

The use of a plurality of bridge passages having flow control valves or wheel cylinders having built-in flow control valves facilitates fluid flow between the first and second chambers of the wheel cylinders. This can lead to a reduction in the inertia forces due to fluid flow through the system resulting in improved isolation of high frequency inputs and sharp edge inputs to the vehicle wheels. The effect of inertia forces within the roll control system will be subsequently described in more detail.

In the second preferred embodiment of the invention, as the roll control system can be switched to provide substantially zero roll stiffness, the use of zero roll stiffness support means for all wheels is not viable. However, zero roll stiffness support means may still be used in combination with independent support means providing some roll stiffness. Therefore, the support means for at least one pair of laterally spaced wheels may include first support means for supporting at least a portion of the load on the associated wheel assemblies, said first support means providing independent resilience for each respective wheel and thereby providing a roll stiffness.

Additionally, the support means for at least one pair of laterally spaced wheels may include second support means for supporting at least a portion of the load on the associated wheel assemblies, said second support means providing combined resilience for each associated wheel assembly, equalising the support force provided to the wheel assemblies and thereby providing substantially zero roll stiffness.

The fluid control means supplies or draws fluid from the fluid conduits of each fluid circuit in one preferred embodiment, the fluid control means may be connected to the first and second fluid circuits so that fluid can be drawn from one fluid circuit while fluid is at the same time pumped into the other fluid circuit. The fluid control means may be controlled by means of an Electronic Control Unit that can, for example, utilize signals indicating vehicle speed, body accelerations, the rate of change of the steering angle and the wheel positions to determine the ride characteristics of the vehicle at any particular instance.

The fluid control means may for example include a fluid pump and a valve for controlling the interconnection of the fluid circuits with the pump. The valve may be solenoid actuated and may be controlled by the Electronic Control Unit. The use of low-pressure fluid means that a relatively high volume of fluid is contained within the roll control system according to the present invention when compared with systems using high-pressure fluid. The practical effect of this is that a relatively high volume of fluid needs to flow through the roll control system when handling different wheel inputs and vehicle motions.

The fluid control means previously described can be used to compensate for the large fluid flows in each fluid circuit by providing additional fluid to one of the fluid circuits or by allowing a transfer of fluid between the fluid circuits to thereby maintain the fluid volume of each fluid circuit. This however requires that the fluid pump of such a system to be suitably oversized to handle the anticipated high fluid flow. The resultant component and operational costs can therefore be quite expensive.

Therefore, according to another preferred embodiment, the fluid control means may further include a fluid volume control unit for supplying and withdrawing fluid from each fluid circuit. The fluid volume control unit may have an inner volume, with a piston assembly being slidably supported within the inner volume. The inner volume may be in the form of a cylindrical bore having a generally cylindrical wall. The piston assembly and inner volume may define two supply chambers provided adjacent opposing sides of the piston assembly such that movement of the piston assembly in any one direction will result in a corresponding reduction and expansion in volume of the respective supply chambers. Each supply chamber may be in fluid communication with one of the fluid circuits of the roll control system, for example, by means of a fluid supply line.

The fluid volume control unit may also include actuation means for displacing the piston assembly. According to a preferred embodiment, the actuation means may be a high pressure hydraulic fluid supply system having at least two fluid outlets. The piston assembly may include a pair of pistons coupled by a common shaft. A central separation wall may be provided within the inner volume of the fluid supply unit, with the common piston shaft extending through an aperture within that wall. The piston shaft may have a relatively wide diameter so as to substantially fill the section of the inner volume in which the piston shaft is located thereby leaving a relatively narrow cylindrical cavity between the inner volume wall and the shaft. The central separation wall may separate this cavity into two actuation chambers.

A separate fluid inlet may be provided for each actuation chamber, and each fluid inlet may be respectively connected to one of the fluid outlets of the hydraulic fluid supply system. The piston assembly may therefore be moved by respectively supplying and removing hydraulic fluid from the actuation chambers. The actuation chambers and hydraulic fluid supply system may provide a high pressure side of the arrangement. The supply chambers and fluid circuits of the roll control system may together provide a low pressure side of the arrangement. The total volume of the supply chambers is substantially greater than the total volume of the actuation chambers. Therefore, the volume of fluid transferred between the supply chambers and the fluid circuits is substantially greater than the volume of hydraulic fluid transferred through the actuation chambers by the hydraulic fluid supply system. This allows a relatively small hydraulic fluid supply system to be used lo actuate the fluid volume control unit. The fluid volume control unit therefore acts as a "volume amplifier" for the hydraulic fluid supply system.

It a fluid volume control unit and a bridge valve are both provided, it may be preferable to add an additional pressure maintenance valve such that the high pressure hydraulic fluid supply system can be used to regulate the pressure in the first and second fluid circuits. Periodically, when the vehicle is travelling in a straight line, the high pressure hydraulic fluid supply system may be regulated to the desired precharge pressure for the first and second fluid circuits, then the pressure maintenance and bridge valves may be momentarily opened. The opening and closing of these valves may be variably controlled (such as by pulse width modulation) to reduce harshness and improve refinement. It is also envisaged that mechanical actuation means may be used to displace the piston assembly of the fluid volume control unit. For example, the piston assembly may include a piston shaft extending outside of the inner volume, with the piston shaft engaging and being driven by a worm gear or other type of mechanical or electric drive. Other actuation means are however envisaged.

The fluid volume control unit operates in effect by providing a volume of fluid to a fluid circuit requiring additional fluid, while simultaneously venting the same volume of fluid from the other fluid circuit. This ensures that the same general volume of fluid is maintained in each fluid circuit. Furthermore, it ensures that the system pressure is maintained within the two fluid circuits. Furthermore, the accumulators of each fluid circuit can always operate properly under various wheel and vehicle operational conditions. Known active roll control systems completely vent all pressure from the unloaded system in roll, rather than merely transferring fluid between the fluid circuits. The result of maintaining pressure in both circuits is an improved response time for the roll control system.

Another advantage of using a fluid volume control unit as described above is that the roll control system could be a low pressure pneumatic system, with gas being used within the fluid circuits and wheel rams. The accumulators could then be in the form of a gas reservoir. This is because the fluid volume control unit will separate the high pressure hydraulic section of the roll control system from the low pressure pneumatic section. The advantage of using a pneumatic arrangement is that it reduces the production of mass flow effects in the roll control system because of the low mass of the gas flowing through the system Ride harshness can be significantly reduced due to the inherent compressibility of the gas which allows small, high frequency inputs to be at least partially absorbed without requiring flow through the whole system.

It is to be appreciated that the conduit size may be selected to provide a degree of the damping required by the damping and roll control system. Depending on the level of ride comfort required in an application, the conduit size may be selected based on a variety of factors such as fluid inertia, fluid friction due to viscosity through range of operating temperatures, etc.

The vehicle support means preferably provides most if not all the vertical support for the vehicle. The damping and roll control system however preferably provides little to no vertical support for the vehicle so the operating pressure can be lower than that required for actively controlled support systems for example. Although the wheel cylinders can experience high dynamic pressures, the pressures are still low enough that existing damper technologies may be applied, Additionally, the majority of fluid conduits in the system may experience lower peak pressures than the wheel cylinders (depending on the position of damper valving) allowing the use of cheaper, lower rated components.

The damping and roll control system of the suspension system according to the present invention can therefore use low pressure components. The wheel cylinders can be constructed using standard vehicle damper and sealing technology. This leads to substantial manufacturing cost savings when compared to higher pressure systems. Also, comfort and NVH problems associated with higher pressure systems such as "stiction" between components are minimized in low pressure systems, the stiction levels being similar to that present in a conventional damper cylinder assembly.

Such a damping and roll control system can be installed in existing vehicle suspension systems, the dampers used in such systems being replaced or adapted for use as the wheel cylinders of the roll control system according to the present invention. The existing vehicle support means supporting the vehicle such as conventional steel or pneumatic springs can be retained. Alternatively, the vehicle support means may be replaced by support means that provide little to no roll support as described previously. This is possible because the damping and roll control system also provides a roll stiffness for the vehicle suspension system.

It will be convenient to further describe the present invention with respect to the accompanying drawings which illustrate preferred embodiments of the invention. Other arrangements of the invention are possible, and consequently the particularity of the accompanying drawings is not to be understood as superseding the generality of the preceding description of the invention.

DETAILED DESCRIPTION OF THE INVENTION

Figure 1:
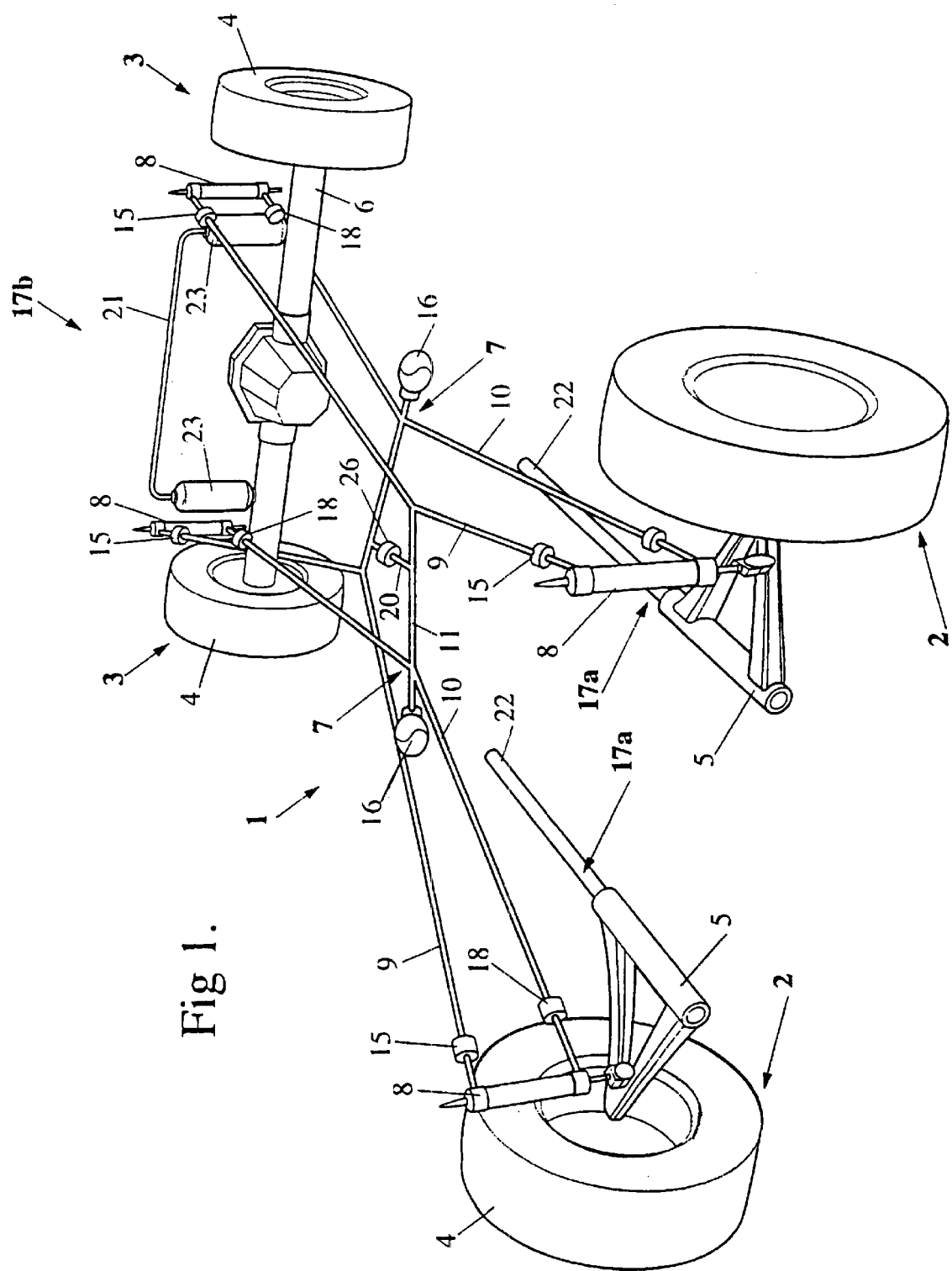
FIG. 1 is a partially schematic view of a first preferred embodiment of a roll control system according to the present invention mounted on wheel assemblies of a vehicle.

Referring initially to FIG. 1, there is shown the front wheel assemblies 2 and rear wheel assemblies a of a vehicle, the body of the vehicle not being shown for clarity reasons. Each front wheel assembly 2 includes a wheel mounting 5 in the form of a wish-bone link contributing to the location of a respective wheel 4 (a second wishbone may be used but is omitted for clarity, other types of wheel locating links may be used). The rear wheel assemblies a have a common solid axle 6 to which each wheel 4 is mounted. The vehicle support means 17a, 17b for supporting the vehicle are shown fixed to the front wishbones 5 and adjacent the rear wheel axle 6 and include independent torsion bars 29 and a pair of air springs 23 interconnected by a conduit 21. The independent form of front vehicle support means 17a shown as torsion bars provide a roll stiffness and the interconnected form of rear vehicle support means provides practically no roll stiffness because fluid is allowed to flow between the air springs 23 via the conduit 21. Alternative vehicle support means can also be used, such as any known independent support means or low roll stiffness support means, or any combination different support means. For example, the vehicle may be supported entirely by independent coil springs. Alternatively, it may be supported by a combination of independent coil springs and interconnected air springs at one or both ends of the vehicle. Any combination of independent, combined or zero roll stiffness support means may be used on the front and rear of the vehicle. Many variations are shown and described in the applicant's International Application No. PCT/AU97/00870 and incorporated herein by reference.

A damping and roll control system 1 interconnects the front and rear wheel assemblies 2, 3 and includes a wheel cylinder 8 respectively provided for each front wheel assembly 2 and rear wheel assembly 3, and a pair of fluid circuits 7.

Figure 2:
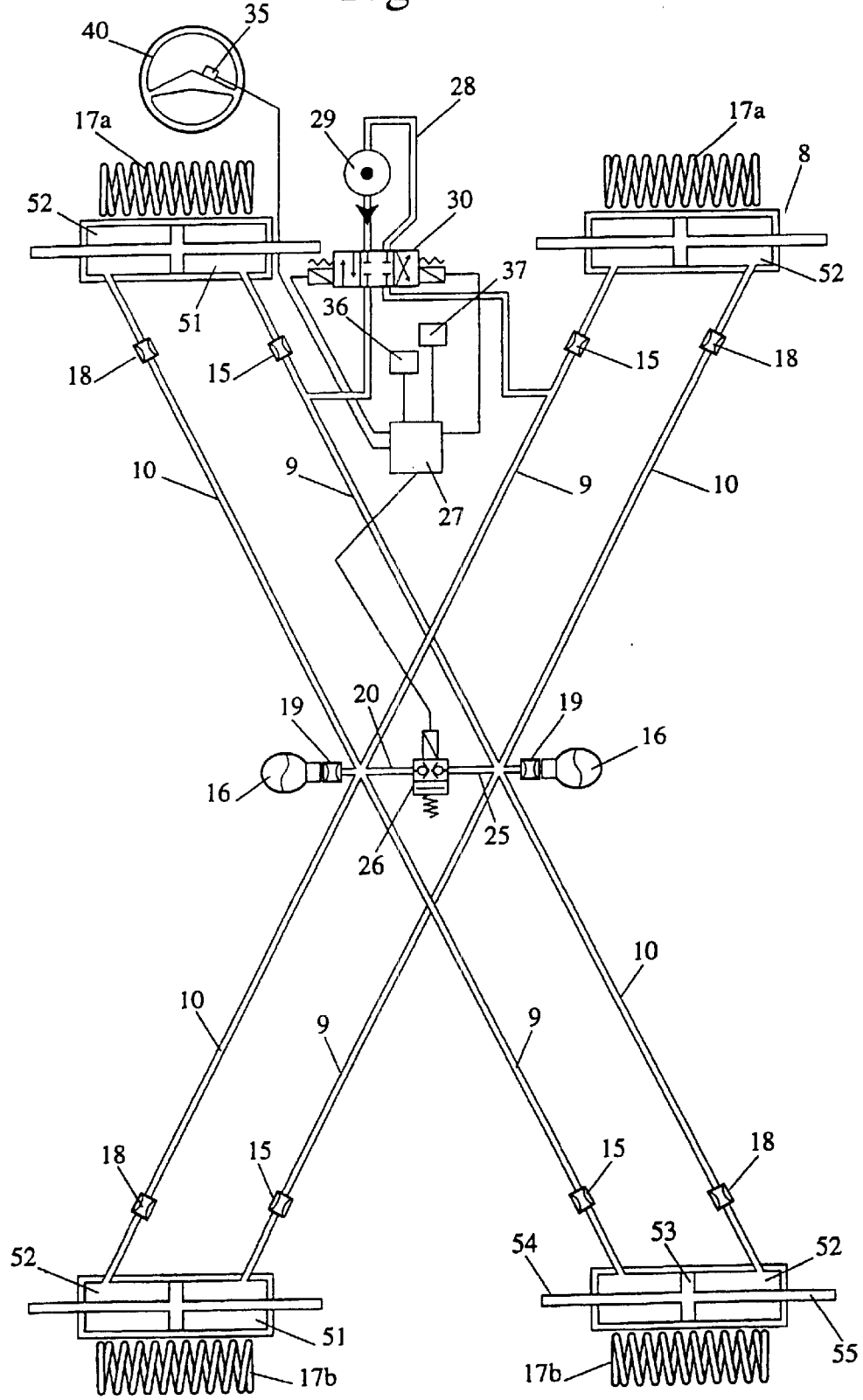
FIG. 2 is a schematic view of second preferred embodiment of a roll control system according to the present invention.

The configuration of the damping and roll control system 1 can be more readily understood by referring to FIG. 2. (Alternative preferred embodiments of the damping and roll control system 1 are discussed later and shown in FIG. 5 onwards) of this arrangement and of subsequent arrangements. It should be noted that corresponding features are designated with the same reference numeral for clarity reasons. Each wheel cylinder 8 has an inner volume 50 separated into an upper chamber 51 and a lower chamber 52 by a piston 53. Piston rods 54, 55 extend from both sides of the piston 53 in the wheel cylinder 8 shown in FIGS. 2 and 3. Each fluid circuit 7 further includes an upper conduit 9 connecting the upper chambers 51 of one pair of longitudinally adjacent wheel cylinders 8, and a lower conduit 10 interconnecting the lower chambers 52 of the opposing pair of longitudinally adjacent wheel cylinders 8. As best shown in FIG. 1, each fluid circuit 7 may further include a cross conduit 11 which connects the lower conduit 10 with the upper conduit 9. The two cross conduits 11 are themselves connected by a bridge passage 20.

Wheel damper valves 18 can be provided on the lower conduit 10, a respective wheel damper valve 18 being provided for the lower chamber 52 of each wheel cylinder 8. Wheel damper valves 15 can also be provided on the upper conduit 9, a respective upper wheel damper valve 15 being provided for each upper chamber 51 of each wheel cylinder 8.

An accumulator 16 can also be provided for each fluid circuit 7. In the arrangement shown in FIGS. 1 and 2, each accumulator 16 is provided at the junction between the lower conduit 10 and cross conduit 11. An accumulator damper valve 19 is provided at the mouth of each accumulator 16.

A flow control valve 26 is provided on the bridge passage 20 for controlling the flow of fluid through the bridge passage 20. The flow control valve 26 is controlled by an electronic control unit (ECU) 27 which controls the valve 26 as a function of different operational parameters. FIG. 2 shows the ECU 27 receiving signals from a steering input sensor 35 located on a steering wheel 40 of the vehicle, a lateral acceleration sensor 36 and a speed sensor 37. The ECU 27 also controls fluid control system 28 having a fluid pump 29 and a directional control valve 30. This system 28 is connected to the lower fluid conduits 10 of each fluid circuit 7 by a supply line 31. The fluid control system 28 allows fluid to be transferred between the fluid circuits 7 as so required.

As the wheel cylinders 8 shown in FIG. 2 include piston rods 54, 55 extending from both sides of the piston 53 such a wheel cylinder 8 provides no support for the vehicle. The support is therefore substantially entirely provided by the vehicle support means 17a, 17b which are schematically shown as coil springs in FIG. 2.

Figure 3:
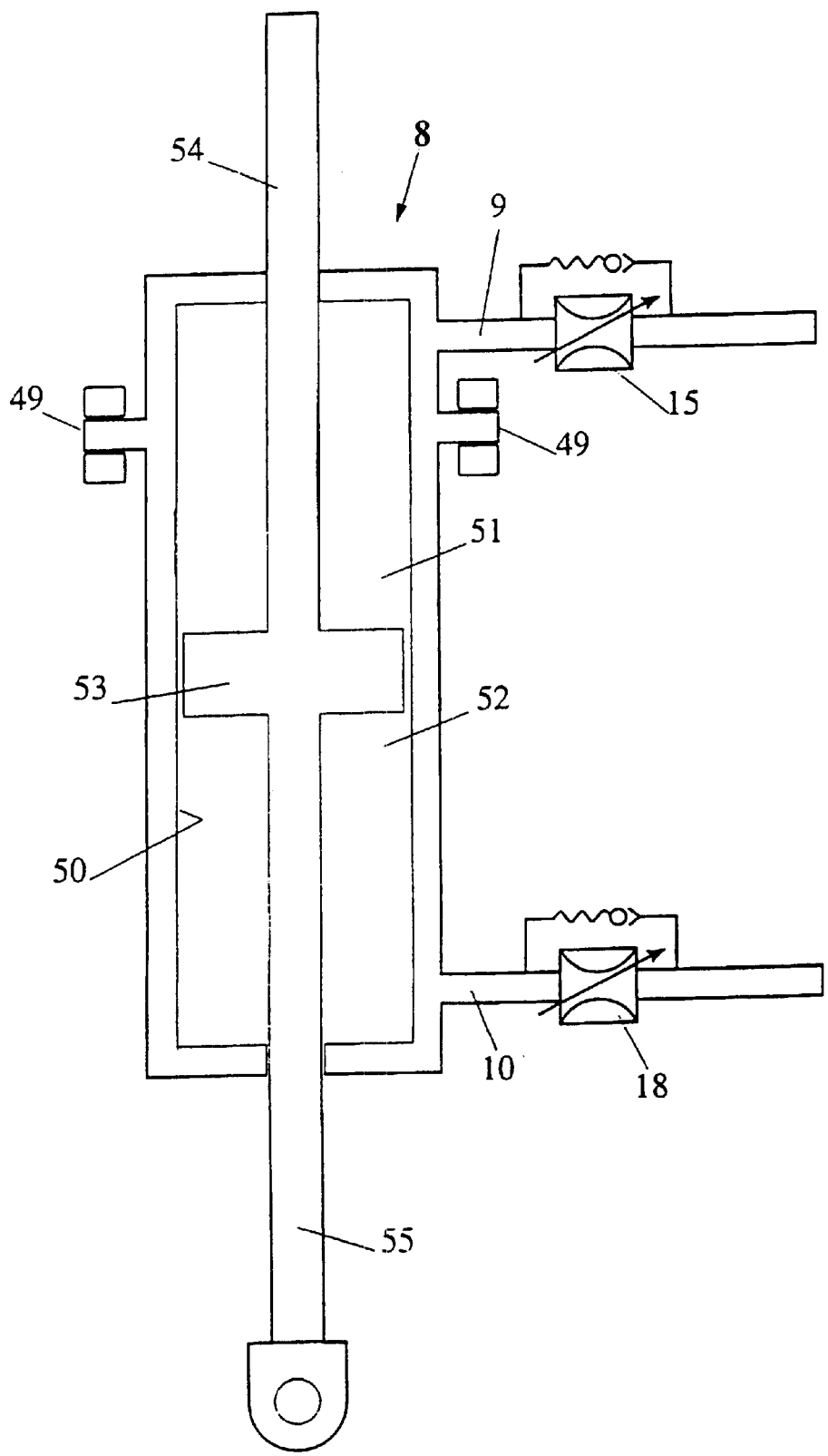
FIG. 3 is a detailed view of a preferred embodiment of a wheel cylinder and wheel damper valve arrangement according to the present invention.

FIG. 3 is a detailed view of the wheel cylinder 8 of FIG. 2 and its associated wheel damper valves 15, 18. The lower wheel damper valve 18, which is schematically shown in FIG. 3, provides a restriction of fluid flow to the lower chamber 52 while allowing relatively unimpeded flow of fluid from that lower chamber 62. By comparison, the upper damper valve 15, also shown schematically in FIG. 3, restricts the flow of fluid from the upper chamber 51 while at the same time providing relatively unimpeding flow of fluid to the upper chamber 51. This arrangement allows a positive pressure to be maintained in the upper and lower chambers 51, 52 and the upper and lower conduits 9, 10 to thereby prevent a vacuum being formed therein. This which can result in aeration of the fluid which can cause the damping and roll control system 1 to not operate properly. Part of a "gimbal" style mount for this "through rod" cylinder design is shown at 49.

Figure 4:
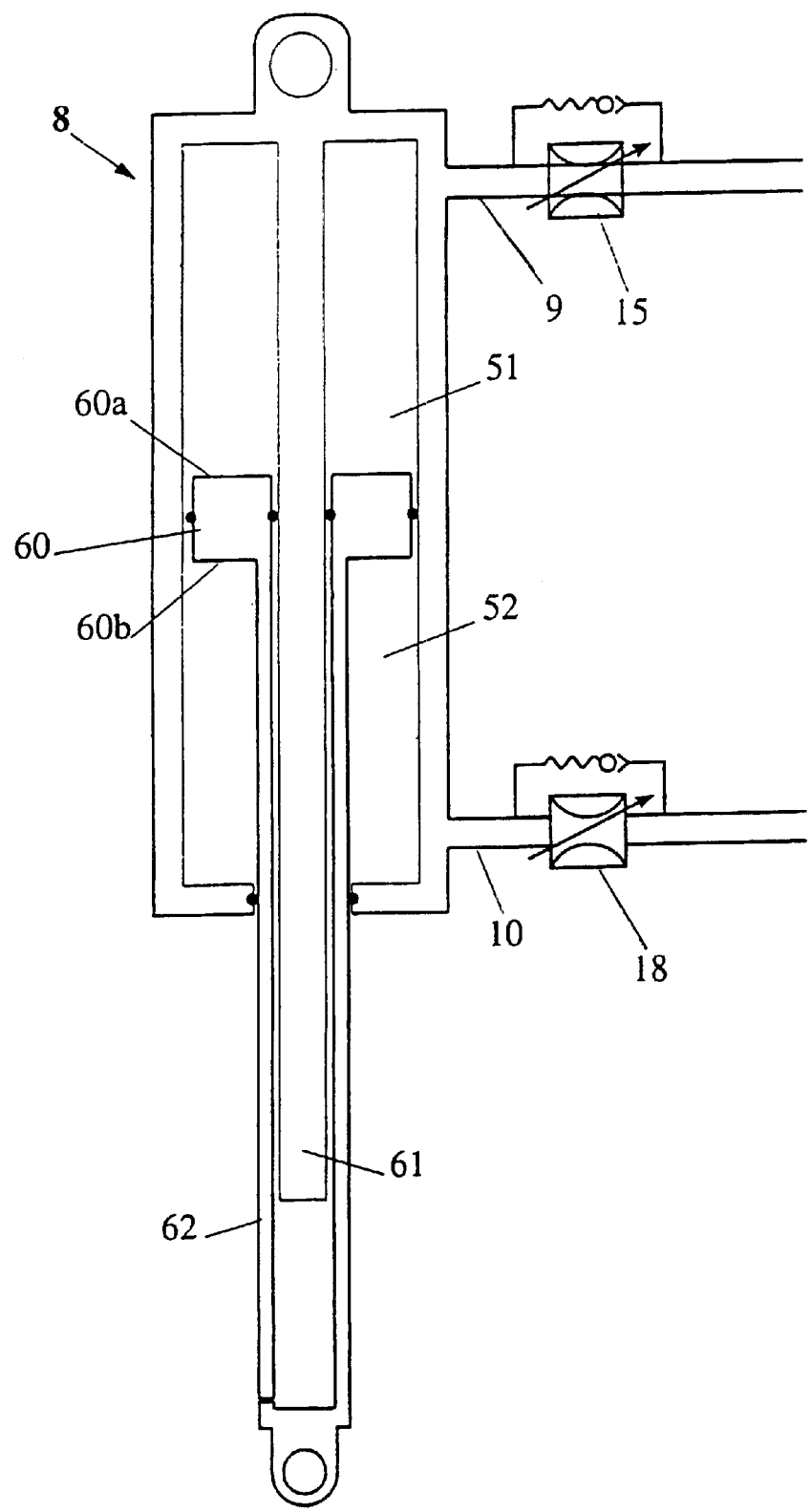
FIG. 4 is a schematic view of another preferred embodiment of a wheel cylinder and wheel damper valve according to the present invention.

FIG. 4 shows an alternative preferred embodiment of the wheel cylinder 8 according to the present invention. This wheel cylinder 8 includes a "dummy" rod 61 extending internally through the inner volume 50 of the wheel cylinder 8. The dummy rod 61 is slidably accommodated within a hollow rod 62 which is itself supported on the piston 60. The piston 60 and hollow rod 62 which can therefore slide over the dummy rod 60. This arrangement reduces the difference in area between the upper face 60a and the lower face 60b of the piston 60. The wheel cylinder 8 according to this arrangement will therefore provide minimal support for the vehicle.

Figure 5:
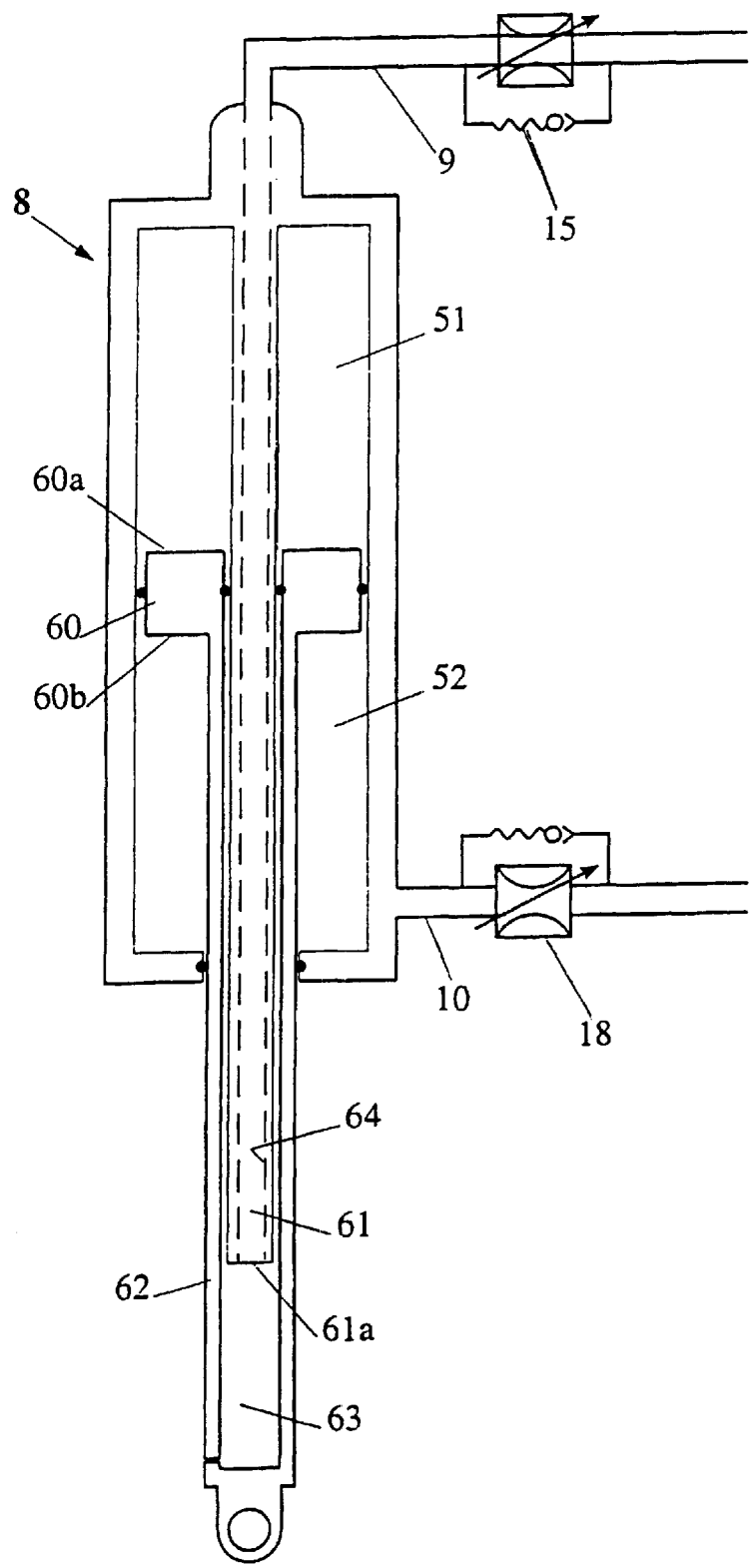
FIG. 5 is a schematic view of a further preferred embodiment of a wheel cylinder according to the present invention.

The wheel cylinder shown in FIG. 4 could also be adapted to provide a support function for the vehicle as well as provide for roll control as shown in FIG. 5. The dummy rod 61 when located within the hollow rod 62 defines a rod chamber 63. The dummy rod 61 has an area 61a at its peripheral end. The diameter of the dummy rod 62, and therefore the end area 61a may be sized such the area of the lower face 60b of me piston is at least substantially the same as the end area 61a of the dummy rod. By sealing the upper chamber 51 and venting the rod chamber 63 along a vent passage 64 provided through the dummy rod 61 so that it becomes part of the roll control system, this allows the wheel cylinder to also function as a support for the vehicle. The sealed upper chamber 51 will in this configuration act as a bounce chamber to provide resilient support for the vehicle such that the need for other support means such as coil springs can be eliminated. The lower chamber 52 and rod chamber 63 can then respectively form part of the fluid circuit of the roll control system.

Figure 6:
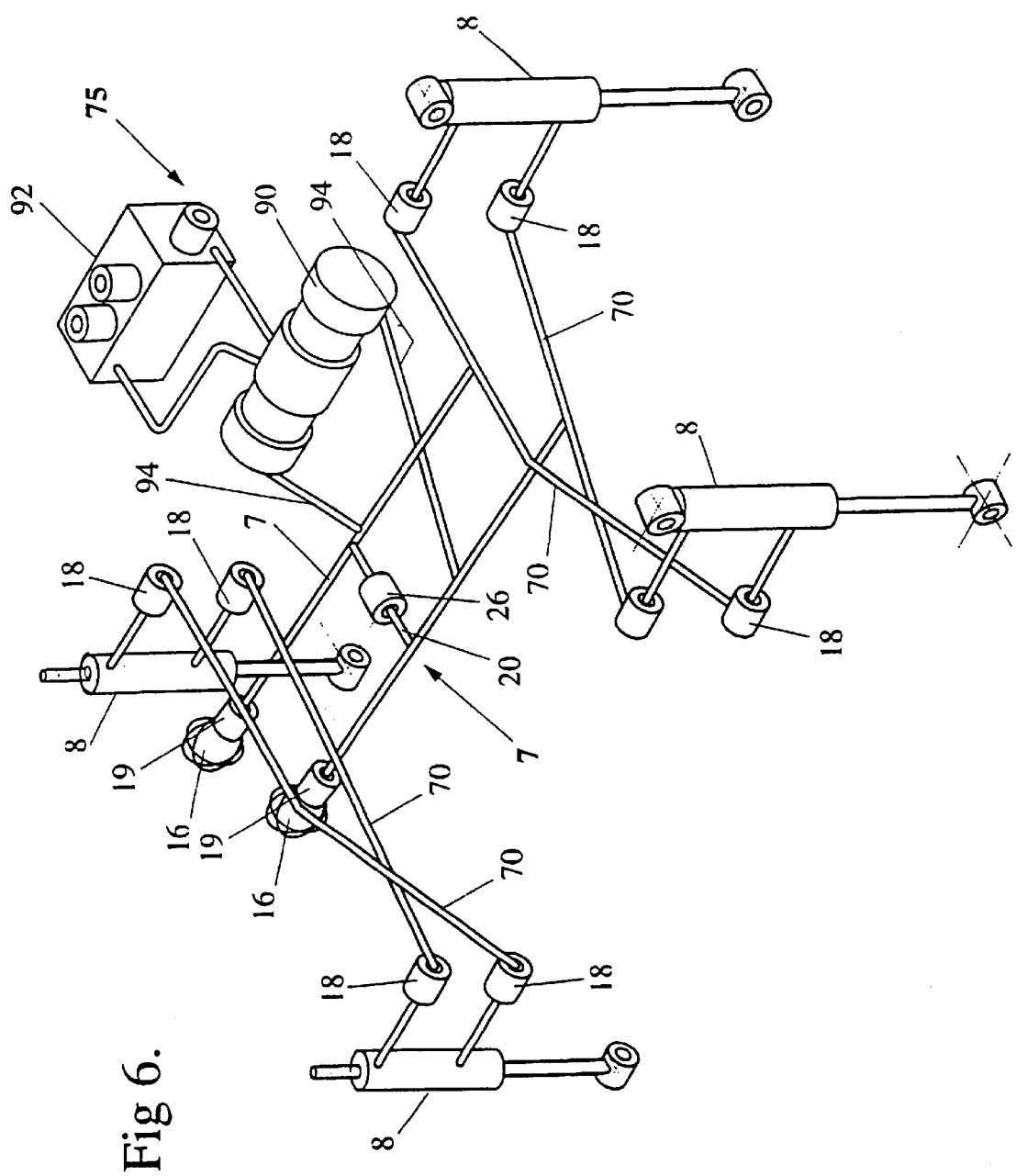
FIG. 6 is a schematic view of a third preferred embodiment of a roll control system according to the present invention.
Figure 7:
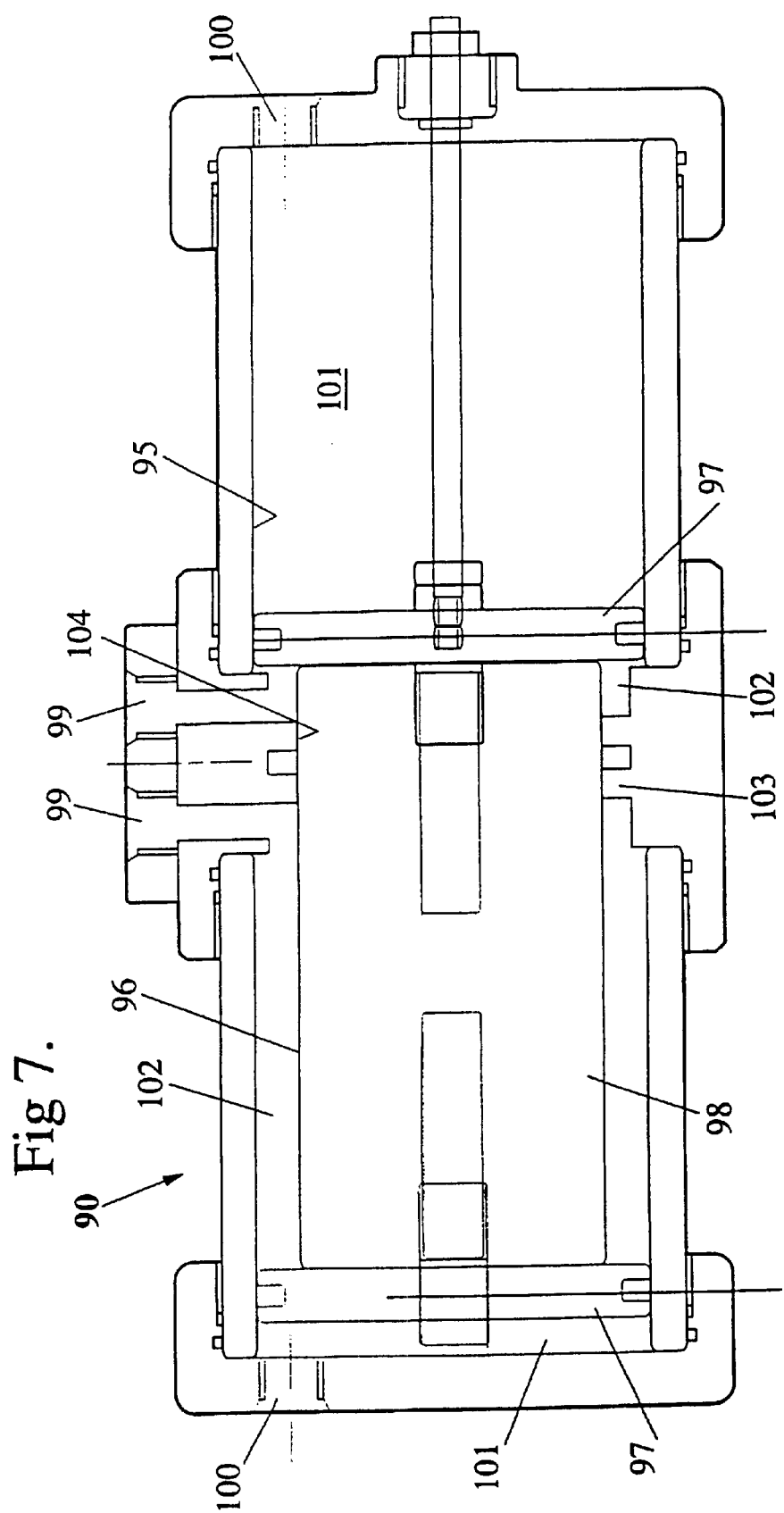
FIG. 7 is a cross-sectional view of a fluid volume control unit of the roll control system of FIG. 3.

FIGS. 6 and 7 show another active preferred embodiment of the roll control system of the present invention. The arrangement of the fluid circuits 7 is operationally the same as the arrangements shown in FIGS. 1 and 2, with each fluid circuit 7 including lateral fluid conduits 70 respectively connecting each pair of front and rear wheel cylinders 8, and a longitudinal fluid conduit 71 connecting the lateral fluid conduits 70. A bridge passage 20 having a flow control valve 26 interconnects the longitudinal fluid conduit 71 of each fluid circuit 7. Damper valves 18, 19 and accumulators 16 are also provided in the roll control system and operate in the same manner as previously described.

This active roll control system further includes fluid control means 75 for transferring fluid between each fluid circuit 7 as a function of parameters such as the wheel inputs and vehicle motion. The fluid control means 75 includes a fluid volume control unit 90, and a high pressure hydraulic fluid supply system including a pump and tank (not shown) and a valve manifold 92. Such fluid supply systems are commonly used in active suspension systems and typically include a fluid pump, a tank, a valve manifold including a directional control valve, a pressure regulating valve and an Electronic Control Unit for controlling the pump and valve as a function of vehicle operating parameters. As such systems are known, they will not be described here in any detail.

The fluid volume control unit 90 shown in more detail in FIG. 7, includes an inner volume having generally cylindrical walls 95 within which is slidably supported a piston assembly 98. The inner volume 95 is divided into two sections by a central separation wall 103. The piston assembly 96 includes a pair of pistons 97 joined together by a common piston shaft 98. The piston shaft 98 extends though an aperture 104 provided in the separation wall 103. The inner volume 95 with the piston assembly 96 supported therein defines two variable volume supply chambers 101 respectively located at opposing ends of the fluid supply unit 90. The piston shaft 98 of the piston assembly 96 has a relatively wide diameter and thereby fills moat of the volume in which it is located. A relatively narrow cylindrical cavity is therefore defined between the piston shaft 98 and the inner volume wall 95, with the separation wall 103 separating this cavity into two variable volume actuation chambers 102. Each supply chamber 101 is connected via an opening 100 to a respective fluid circuit 7 via a supply conduit 94, while each actuation chamber 102 is connected to the hydraulic fluid supply system 92 through an opening 99 and an actuation conduit 112.

The supply of hydraulic fluid to one actuation chamber 102, and the simultaneous withdrawal of fluid from the other actuation chamber 102 results in movement of the piston assembly 96. This results in a corresponding change in the volume of each supply chamber 101, with the volume of one supply chamber 101 increasing while there is a simultaneous decrease in volume of the other supply chamber 101. The total volume of the actuation chambers 102 is substantially smaller than the total volume of the supply chambers 101. Therefore, only a relatively small amount of hydraulic fluid needs to be transferred in the actuation chambers 102 to result in a substantial transfer of fluid through the supply chambers 101, and therefore the fluid circuits 7.

During vehicle motions, in particular when undergoing roll motion, there can be significant changes in the volume of fluid in each fluid circuit. This can effect the operation of the accumulators 16 as previously described. The flow control means 75 therefore acts to maintain the fluid volume within each of the fluid circuits 7 so that the accumulators can operate properly. Furthermore, the system pressure is maintained in each of the fluid circuits. This therefore ensures that the response time of the roll control system is maintained.

Figure 8:
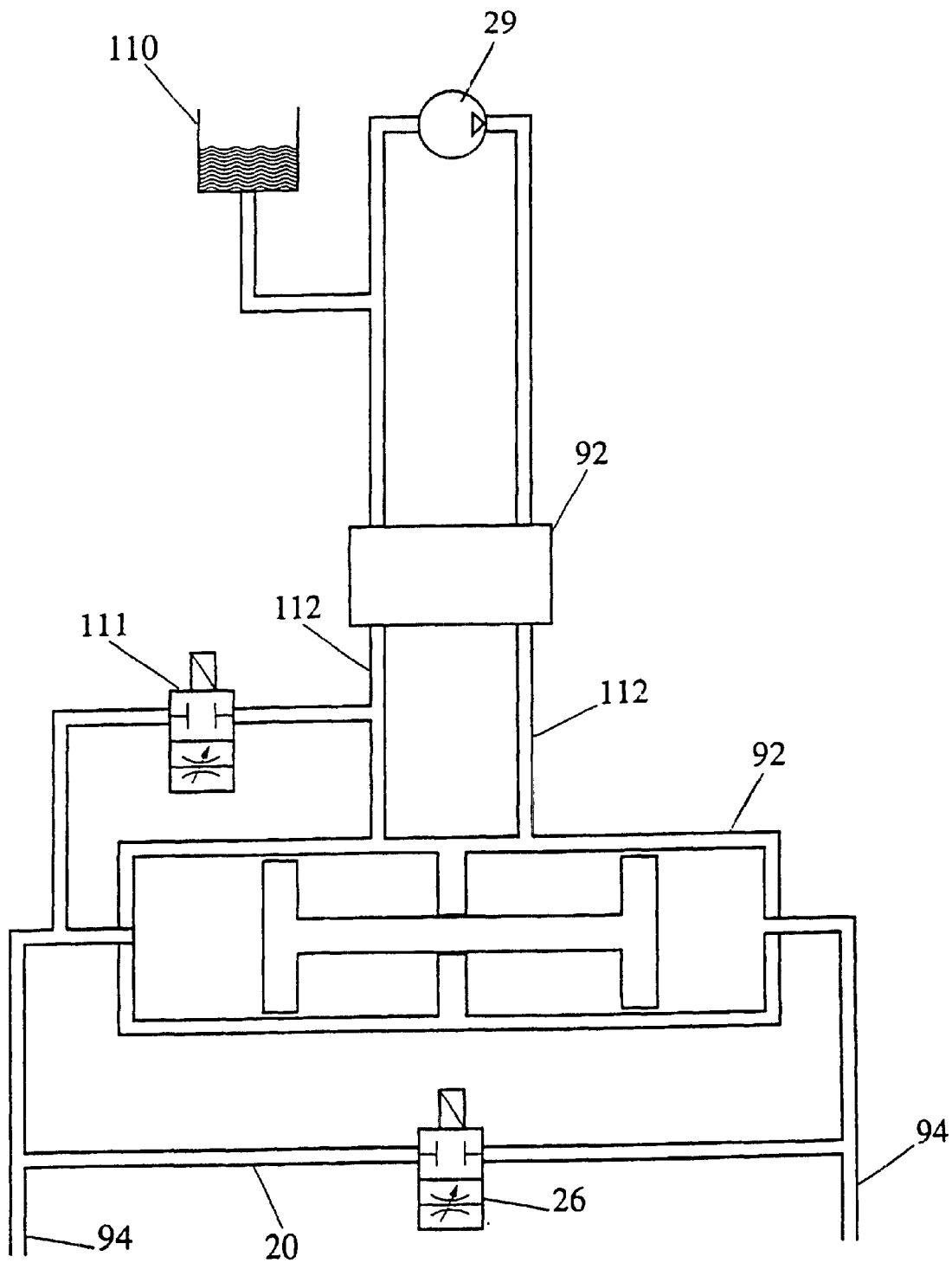
FIG. 8 shows an improvement to the third embodiment of a roll control system according to the present invention.

FIG. 8 shows the implementation of the pressure maintenance valve 111, which can be used in conjunction with the bridge valve 26 and a fluid reservoir 110 to maintain a constant average pressure in the roll control system. The pressure maintenance valve 111 can be positioned between one of the actuation conduits 112 and one of the supply conduits 112 to selectively interconnect the fluid supply system valve manifold directly to the first and second roll control circuits (not shown). When the vehicle is travelling in a straight line or static the ECU (not shown) can regulate the pressure in the actuation conduits to the desired roll control circuit static pressure. The pressure maintenance valve and the bridge valve can then be opened momentarily. The system still operates as an essentially sealed system, but pressure changes due to expansion and contraction of the fluid can be reduced. Additionally, if desired, the regulated so pressure can be changed with other inputs, for example a driver operated comfort/sport switch, to enable the basic roll stiffness of the system to be modified. Other changes can also be made to the active roll control algorithm and damping rates between the driver selected modes.

Figure 9:
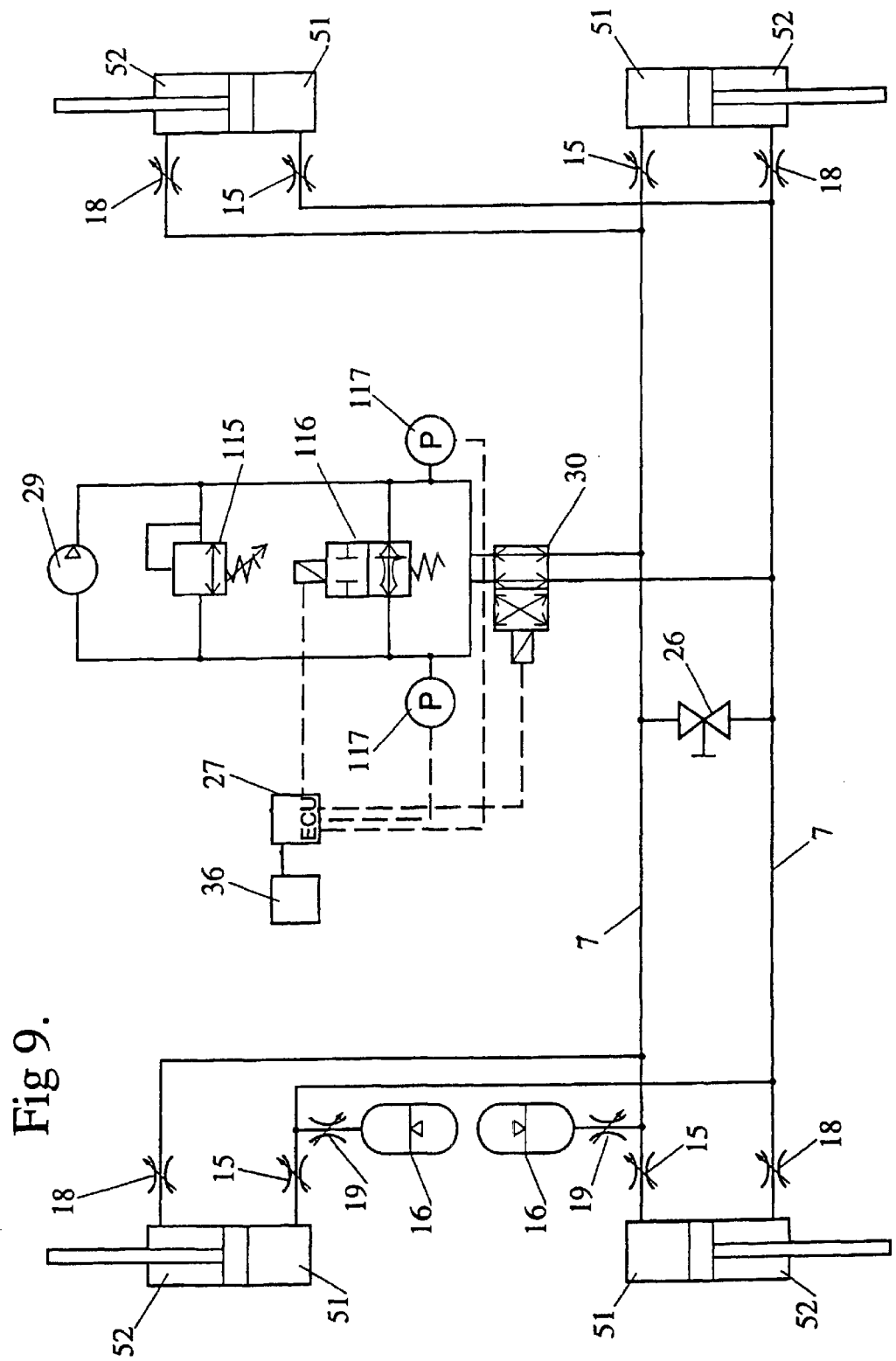
FIG. 9 is a schematic view of a fourth preferred embodiment of a damping and roll control system according to the present invention.

FIG. 9 shows a fourth embodiment of the damping and roll control system in which the hydraulic fluid supply system directly powers the roll attitude of the vehicle (without the need of a fluid volume control unit) as in FIG. 2. In this case the hydraulic fluid supply unit must have a high flow rate, as with the version in FIG. 2. A pressure relief valve 115 is provided to avoid over pressure in the system. The actuation pressure provided by the pump to the directional control valve 30 is regulated by a regulating valve 116, which is controlled by the ECU 27. Pressure sensors 117 are provided to supply signals indicative of the pressure either side of the pressure regulating valve 116.

In this Figure, the directional control valve is illustrated as a two position device. Therefore the roll control system circuits 7 cannot be sealed, but in straight line running, the pressure regulating valve 116 can be set to its most free flow position, essentially becoming a bridge valve between the two roll control circuits7. An optional bridge valve 26 is shown directly connecting the two circuits 7 to give increased flow. As with other embodiments of the roll control system, alternatively or additionally, more bridge valves may be provided (not shown), for example at each wheal cylinder as discussed above.

The wheel cylinders are conventional single rod units and the support springs are not shown.

Figure 10:
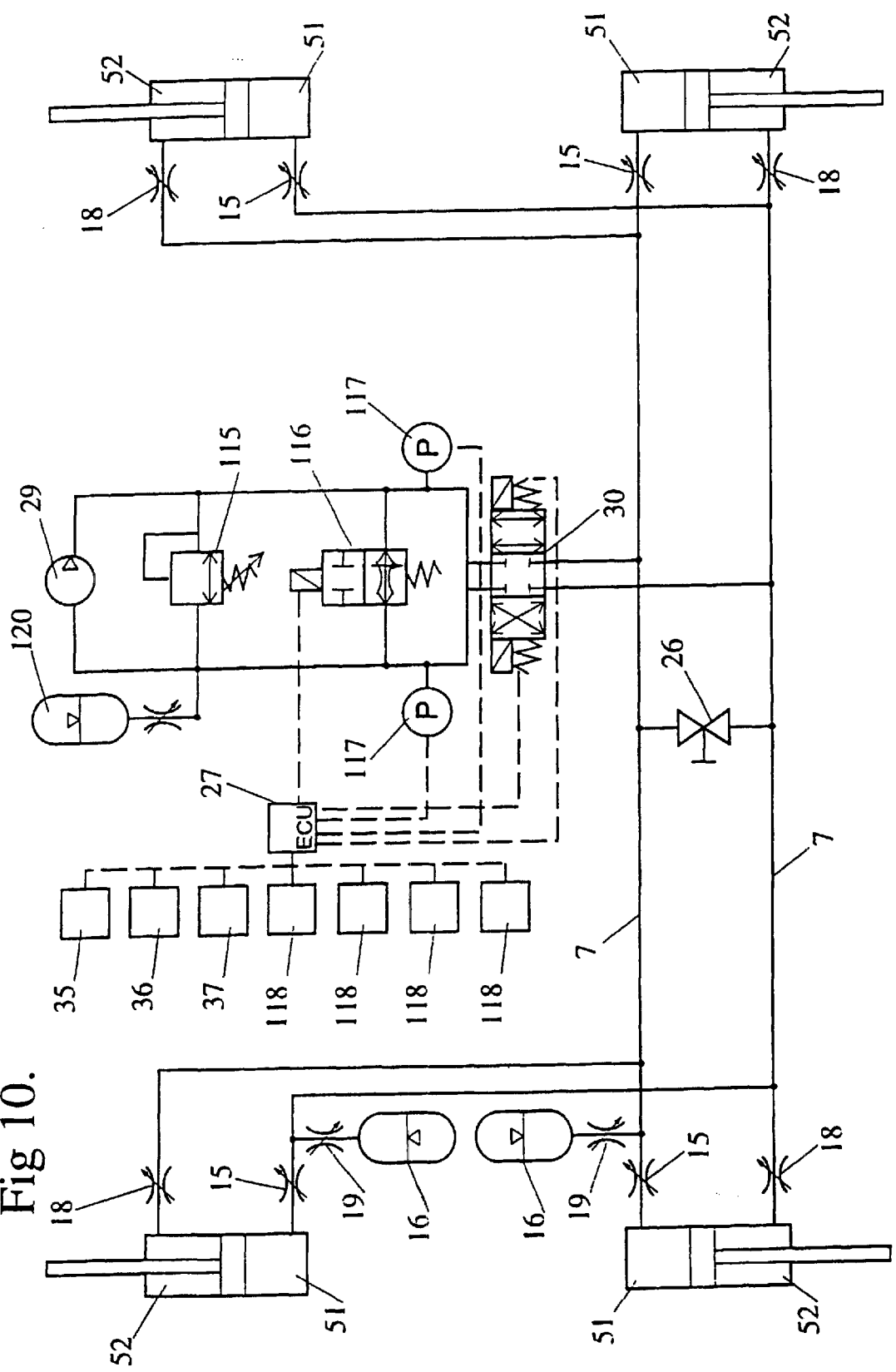
FIG. 10 is a schematic view of a fifth preferred embodiment of a damping and roll control system according to the present invention.

FIG. 10 shows a fifth embodiment of the damping and roll control system in which the fluid supply unit includes a pressurised fluid storage device such as a hydropneumatic accumulator 120. Unlike the reservoir in FIG. 8, this fluid storage device must be pressurized to the static precharge pressure of the roll control system. However, the additional resilience helps in limiting the pressure change within the system due to temperature changes or fluid loss, improving time to service. The pressurised fluid storage device need not be a sealed accumulator. For example, to permit easier servicing to fluid level and system precharge, and as the pressure in the device is only around the static precharge pressure of the system, a pressurised tank may be used, which can be easily vented of pressure to allow a cap to be removed and the fluid level checked, then the cap replaced and tank repressurised using any known method.

The basic arrangement of the damping and roll control system is similar to that shown in FIG. 9, but the directional control valve 30 includes a closed position as in FIG. 2. Alternatively, the directional control valve may include a position to interconnect the two roll control circuits 7. Again, the bridge valve is optional and may be deleted or replaced with multiple bridge valves. Additionally, wheel position sensors 118 are shown to enable supply signals to be sent to the ECU 27. These may be used in any of the previous embodiments of the present invention.

When the damping of the system is also controlled electronically, it can be advantageous to include other sensors such as body rotation and vertical accelerometers for example.

When the roll stiffness of the system is changed, for example when bridge valves are opened or the system static pressure altered, the wheel rates change, so the damping can be changed to suit, in line with any ride comfort selection made by the driver.

Alternative pressure maintenance arrangements may be provided. For example, using a three position directional control valve allows the pressure in the damping and roll control system to be sealed in whilst the pressure maintenance routine is executed. For example, with the fluid supply system isolated from the damping and roll control system, such as during straight line running, the pump may be used to draw fluid from an additional unpressurised tank and increase the static pressure in the fluid supply system accumulator, using a valve arrangement to also allow return of fluid from the fluid supply system to the tank. Many such arrangements are known already.

What is claimed is:

1. A damping and roll control system for a vehicle suspension system, the vehicle having at least one pair of laterally spaced front wheel assemblies and at least one pair of laterally spaced rear wheel assemblies, each wheel assembly including a wheel and a wheel mounting locating the wheel to permit movement of the wheel in a generally vertical direction relative to a body of the vehicle, and vehicle support means for providing at least substantially all of the support for the vehicle; the damping and roll control system including:

wheel cylinders respectively locatable between each wheel mounting and the body of the vehicle, each wheel cylinder including an inner volume separated into first and second chambers by a piston supported within the wheel cylinder;

first and second fluid circuits respectively providing fluid communication between the wheel cylinders by fluid conduits, each said fluid circuit providing fluid communication between the first chambers of the wheel cylinders on one side of the vehicle and the second chambers of the wheel cylinders on the opposite side of the vehicle to thereby provide roll support decoupled from the warp mode of the vehicle suspension system by providing a roll stiffness about a level roll attitude whilst simultaneously providing substantially zero warp stiffness;

each fluid circuit including one or more fluid accumulators for providing roll resilience;

the or at least one of the accumulators on each fluid circuit including an accumulator damper means for controlling the rate of fluid flow into and out of the accumulator;

damper means for controlling the rate of fluid flow into and out of at least one chamber of each wheel cylinder; and a fluid control means connected to said first and second fluid circuits for supplying or drawing fluid from each said fluid circuit as a function of the ride characteristics of the vehicle;

the damping and roll control system thereby providing substantially all of the damping of the vehicle suspension system.

2. A damping and roll control system according to claim 1, wherein the vehicle support means provides at least substantially all of the support for the vehicle.

3. A damping and roll control system according to claim 1 or 2, wherein the vehicle support means for at least one end of the vehicle include first support means, the first support means supporting at least a portion of the load on the wheels and providing substantially zero roll and warp stiffness.

4. A damping and roll control system according to claim 1 or 2, wherein each fluid circuit includes a first fluid conduit providing fluid communication between the first chambers of the wheel cylinders on one side of the vehicle, and a second fluid conduit providing fluid communication between the second chambers of the wheel cylinders on the opposite side of the vehicle, the first and second fluid conduits being in fluid communication.

5. A damping and roll control system according to claim 1 or 2, wherein each fluid circuit includes first and second diagonal fluid conduits, each respectively providing fluid communication between the first chamber of one wheel cylinder on one side of the vehicle and the second chamber of the diagonally opposite wheel cylinder on the other side of the vehicle, the first diagonal fluid conduit between one pair of diagonally opposite wheel cylinders being in fluid communication with the second diagonal fluid conduit between the other pair of diagonally opposite wheel cylinders.

6. A damping and roll control system according to claim 1 or 2, wherein each fluid circuit includes a front fluid conduit providing fluid communication between the wheel cylinders of the front wheel assemblies, and a rear fluid conduit providing fluid communication between the wheel cylinders of the rear wheel assemblies, with the front and rear conduits respectively providing fluid communication between the first chamber of the wheel cylinder at one side of the vehicle with the second chamber of the wheel cylinder at the opposite side of the vehicle, the front and rear conduits being in fluid communication.

7. A damping and roll control system according to claim 1, wherein the damper means are located at or in the wheel cylinders.

8. A damping and roll control system according to claim 1, wherein the damper means are located in the conduits.

9. A damping and roll control system according to claim 1 wherein the damper means are located in a manifold block providing fluid communication between the first and second conduits to form the first and second fluid circuits.

10. A damping and roll control system according to claim 1 wherein the damper means are bi-directional damper valves for controlling the fluid flow rate to and from at least one of the first or second chambers of each said wheel cylinder.

11. A damping and roll control system according to claim 1, wherein the damper means includes a single direction damper valve for controlling the fluid flow rate from each said chamber of each said wheel cylinder.

12. A damping and roll control system according to claim 11, wherein the single direction damper valve is used in parallel with a non-return valve.

13. A damping and roll control system according to claim 1 wherein each fluid circuit includes a second fluid accumulator, and a roll resilience switching valve located between the second accumulator and the fluid circuit for selectively communicating the second accumulator with said fluid circuit and thereby control the degree of roll resilience.

14. A damping and roll control system according to claim 1, wherein a bypass passage is provided around the damper means for the accumulator, the bypass passage including a valve to open or close the bypass passage.

15. A damping and roll control system according to claim 1, wherein the damping and roll control system has a pressure precharge.

16. A damping and roll control system according to claim 1, wherein the wheel cylinders provide little to no support for the vehicle.

17. A damping and roll control system according to claim 16, wherein a piston rod respectively extends from opposing sides of the piston, the diameter of each piston rod being at least substantially equal, such that the effective piston area in the first and second chamber of each wheel cylinder are at least substantially equal.

18. A damping and roll control system according to claim 16, wherein a hollow piston rod extends from one side of the piston, and an inner rod is supported within the inner volume of the wheel cylinder and at least partially accommodated within the hollow piston rod.

19. A damping and roll control system according to claim 18, wherein the hollow piston rod and inner rod together define a rod chamber of the wheel cylinder, the area of the free end of the inner rod being at least substantially identical to the piston area facing the chamber accommodating the hollow piston rod, the rod chamber forming part of said fluid circuit one of the other said chambers of the wheel cylinder forming the other chamber for the fluid circuit, the remaining chamber forming part of a support circuit for the vehicle.

20. A damping and roll control system according to claim 1, further including means for selectively providing fluid communication between the first and second fluid circuits.

21. A damping and roll control system according to claim 20, wherein said means includes at least one bridge passage connecting said first and second fluid circuits, and a flow control valve for controlling the flow through the bridge passage.

22. A damping and roll control system according to claim 21, further including an accumulator on the bridge passage.

23. A damping and roll control system according to claim 21, wherein a respective bridge passage and flow control valve is provided for each wheel cylinder.

24. A damping and roll control system according to claim 1, wherein the piston of each wheel cylinder includes an integral flow control valve and damper valve for controlling the flow between the first and second chambers.

25. A damping and roll control according to claim 1, wherein the fluid control means includes a fluid pump, a valve for controlling the interconnection of the fluid circuits with the pump, and an Electronic Control Unit for controlling the fluid pump and valve as a function of the ride characteristics of the vehicle.

26. A damping and roll control system according to claim 1, wherein the fluid control means includes a fluid volume control unit for supplying and withdrawing fluid from each fluid circuit, the control unit including an inner volume, a piston assembly slidably supported within and dividing the inner volume into two variable volume supply chambers, and actuation means for displacing the piston assembly, wherein each fluid circuit is in communication with a respective supply chamber.

27. A damping and roll control system according to claim 26, wherein the piston assembly is actuated by a high pressure hydraulic fluid supply system.

28. A damping and roll control system according to claim 27, wherein the piston assembly includes a pair of pistons coupled by a common shaft, the inner volume is divided by a central separation wall, with the common shaft extending through an aperture in said the actuation means such that the pistons are located on opposing sides of the separation wall to thereby define actuation chambers on opposing sides of the separation wall, wherein the high pressure hydraulic fluid is supplied to or withdrawn from each actuation chamber to thereby displace the piston assembly.

29. A damping and roll control system according to claim 28, wherein the common shaft has a diameter which substantially fills the volume within which the shaft is located such that the combined volume of the supply chambers is substantially greater than the combined volume of the actuation chambers.

30. A damping and roll control system according to claim 28, wherein the piston assembly is mechanically actuated.

* * * * *

UNITED STATES PATENT AND TRADEMARK OFFICE
CERTIFICATE OF CORRECTION

PATENT NO.       : 6,519,517 B1
DATED            : February 11, 2003
INVENTOR(S)      : Christopher B. Heyring It is certified that error appears in the above-identified patent and that said Letters Patent is hereby corrected as shown below:

Title page,
Item [57], ABSTRACT,
Line 3, "lately" should be -- laterally --

Column 4,
Line 15, "it" should be -- if --

Column 5,
Line 7, "It" should be -- If --
Line 30, before "bar" insert -- 20 --

Column 9,
Line 67, "lo" should be -- to --

Column 10,
Line 3, "It" should be -- If --

Column 11,
Line 67, delete the first occurrence of "a" and insert -- 3 --

Column 12,
Line 6, delete the first occurrence of "a" and insert -- 3 --
Line 10, "bars 29" should be -- bars 22 --

Column 13,
Line 23, "chamber 62" should -- chamber 52 --
Line 52, "rod 62" should be -- rod 61 --

Column 14,
Line 36, "moat" should be -- most --

Column 15,
Line 7, "supply conduit 112" should be -- supply conduit 94 --
Line 17, delete "so"
Line 33, before "either" insert -- on --

UNITED STATES PATENT AND TRADEMARK OFFICE
CERTIFICATE OF CORRECTION

PATENT NO. : 6,519,517 B1
DATED : February 11, 2003
INVENTOR(S) : Christopher B. Heyring It is certified that error appears in the above-identified patent and that said Letters Patent is hereby corrected as shown below:

<u>Column 16,</u>
Line 45, "wheal" should be -- wheel --

Signed and Sealed this

Thirtieth Day of December, 2003

JAMES E. ROGAN
*Director of the United States Patent and Trademark Office*